United States Patent
McClean

(10) Patent No.: US 9,488,354 B2
(45) Date of Patent: Nov. 8, 2016

(54) ENERGY HYBRID ILLUMINATED SIGNAGE APPARATUS

(71) Applicant: ECOBALLAST TECHNOLOGIES LIMITED, Dunboyne, County Meath (IE)

(72) Inventor: Joseph William McClean, Dunboyne (IE)

(73) Assignee: ECOBALLAST TECHNOLOGIES LIMITED, Dunboyne, County Meath (IE)

( * ) Notice: Subject to any disclaimer, the term of this patent is extended or adjusted under 35 U.S.C. 154(b) by 0 days.

(21) Appl. No.: 14/380,029

(22) PCT Filed: Feb. 25, 2013

(86) PCT No.: PCT/EP2013/053739
§ 371 (c)(1),
(2) Date: Aug. 20, 2014

(87) PCT Pub. No.: WO2013/124488
PCT Pub. Date: Aug. 29, 2013

(65) Prior Publication Data
US 2015/0042493 A1   Feb. 12, 2015

(30) Foreign Application Priority Data

Feb. 24, 2012   (IE) .................................. S2012/0097

(51) Int. Cl.
*G08B 5/22* (2006.01)
*F21V 23/04* (2006.01)
(Continued)

(52) U.S. Cl.
CPC ........... *F21V 23/0464* (2013.01); *G08G 1/095* (2013.01); *G09F 9/305* (2013.01); *G09F 9/313* (2013.01); *G09F 9/33* (2013.01); *G09F 9/35* (2013.01); *G09F 13/22* (2013.01); *H05B 33/0854* (2013.01); *H05B 37/0218* (2013.01); *G09F 2009/3055* (2013.01); *G09F 2013/0472* (2013.01); *G09F 2013/222* (2013.01); *G09F 2013/225* (2013.01)

(58) Field of Classification Search
CPC .................................................. F21V 23/0464
USPC ................ 340/907, 815.45; 315/154; 40/541
See application file for complete search history.

(56) References Cited

U.S. PATENT DOCUMENTS

| 6,737,983 B1 * | 5/2004 | Temple .................... 340/815.45 |
| 2004/0175232 A1 * | 9/2004 | Hunter .................... E01F 9/065 404/16 |

(Continued)

FOREIGN PATENT DOCUMENTS

| DE | 299 06 995 | 7/1999 |
| EP | 0 621 576 | 10/1994 |
| WO | WO 03/007282 | 1/2003 |

OTHER PUBLICATIONS

International Search Report and Written Opinion of the International Searching Authority, Intl. Applic. No. PCT/EP2013/053739, 7 pages, Jun. 2013.

*Primary Examiner* — Brent Swarthout

(57) ABSTRACT

An illuminated signage apparatus operable in high ambient light environments and in low ambient light environments comprises a first light source (30) operable in high ambient light environments and a second light source (26) operable in low ambient light environments. It includes means to detect a relevant ambient light environment threshold and means to switch between the operation of the first (30) and second light sources (26).

10 Claims, 9 Drawing Sheets

(51) Int. Cl.
  *G09F 9/305* (2006.01)
  *G09F 9/313* (2006.01)
  *G09F 9/33* (2006.01)
  *G09F 9/35* (2006.01)
  *G09F 13/22* (2006.01)
  *G08G 1/095* (2006.01)
  *H05B 33/08* (2006.01)
  *H05B 37/02* (2006.01)
  *G09F 13/04* (2006.01)

(56) References Cited

U.S. PATENT DOCUMENTS

2007/0075935 A1* 4/2007 Mesmer ............... G09G 3/3233
　　　　　　　　　　　　　　　　　　　　　　345/76
2009/0244871 A1* 10/2009 Lin .......................... F21S 2/005
　　　　　　　　　　　　　　　　　　　　　　361/791
2011/0062860 A1* 3/2011 Reynolds ............ H01L 51/5203
　　　　　　　　　　　　　　　　　　　　　　313/504

* cited by examiner

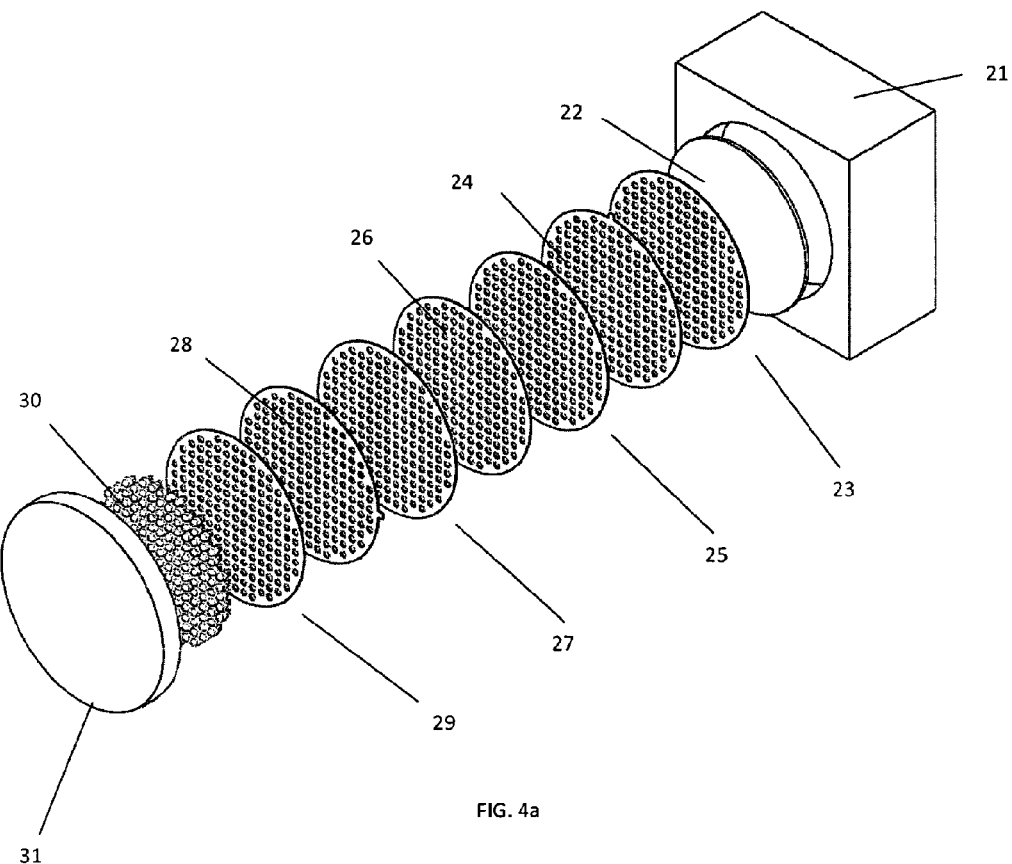
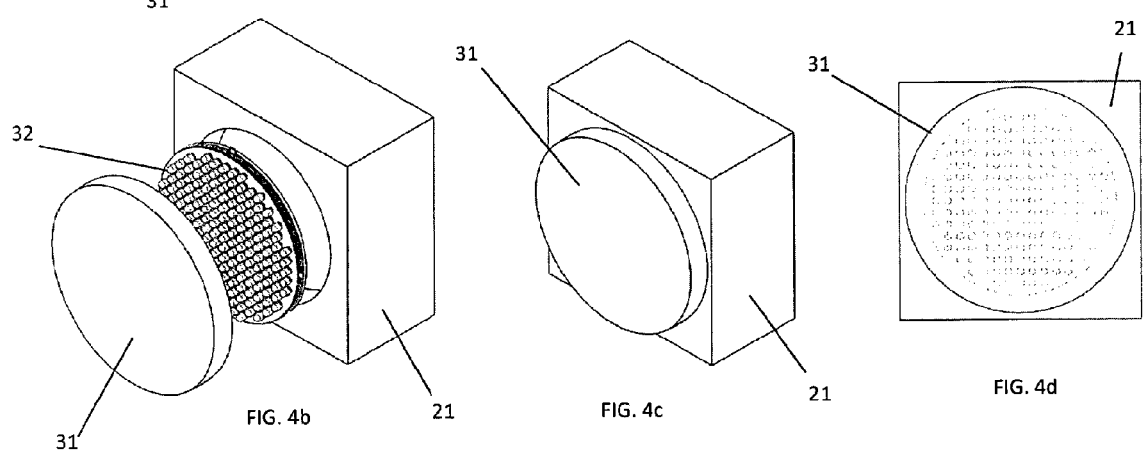
FIG. 4a
FIG. 4b FIG. 4c FIG. 4d

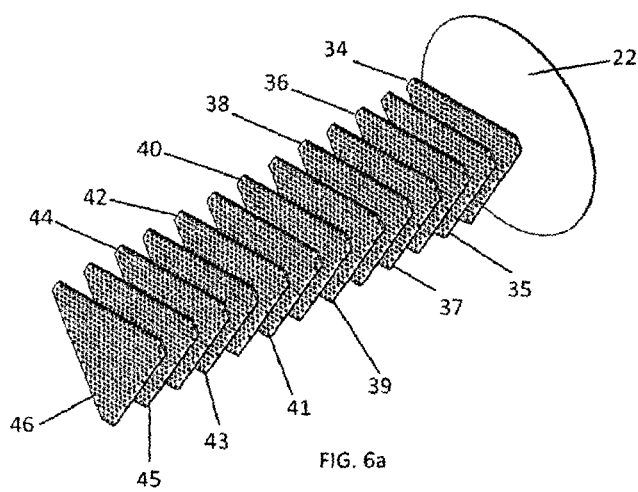# 
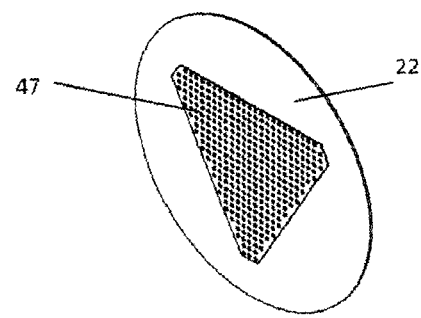
FIG. 6a
FIG. 6b
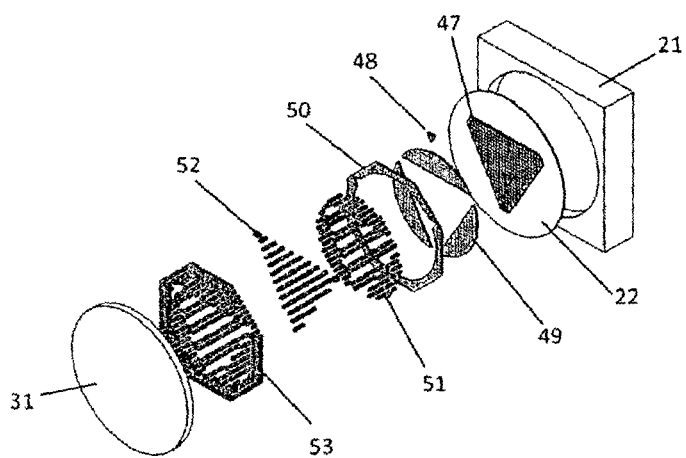
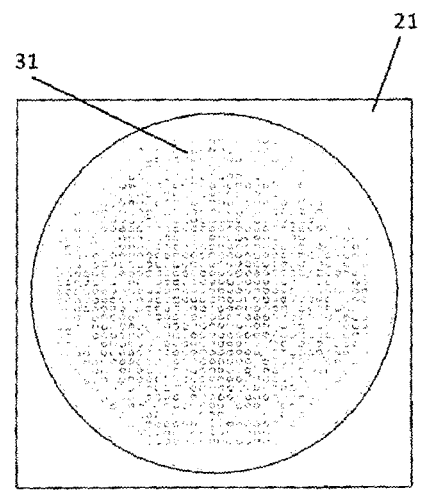
FIG. 6c
FIG. 6d
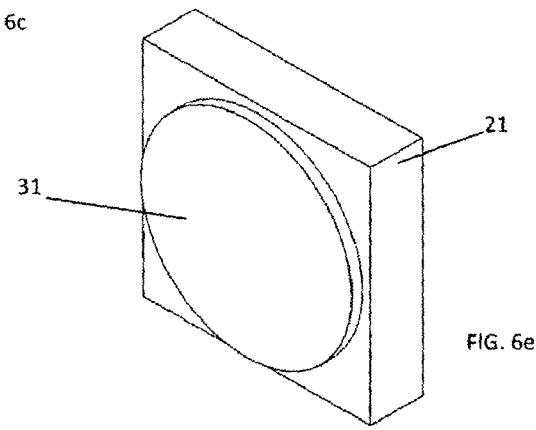
FIG. 6e

ENERGY HYBRID ILLUMINATED SIGNAGE APPARATUS

BACKGROUND TO THE INVENTION

1. Field of Invention

The present invention relates to an illuminated signage apparatus operable in high ambient and low ambient light environments and by way of example, relates to a signage light module, such as a traffic light module.

2. Identification of Prior Art

LED traffic light modules are currently being used to replace incandescent lamp traffic light modules. The rationale behind the replacement is energy efficiency. A typical incandescent lamp traffic light module consumes about 80 W to 120 W of power when illuminated compared to 20 W to 30 W for an LED traffic light module. Furthermore LED traffic light modules have longer operational life times and require less ongoing maintenance.

Prior Art concerning LED traffic light modules is disclosed in various publications including; *Tech Update* by E Source, November 1995, pp. 1-16 and Secs. 13.1 to 13.2.2 of E Source Publication, 1994. The LED traffic light module 1 disclosed includes the vertical or horizontal arrangement of at least three round traffic light signals (Red, Yellow, Green) and can also include a protected turn signal (Red Arrow, Green Arrow) (See FIG. 1*a*, FIG. 1*b*, FIG. 1*c*—Prior Art). Each traffic light is comprised of an array of LEDs 5 patterned in a circular or arrow shaped arrangement 4. This Prior Art states the advantages of lower power consumption and longer operational life time compared with incandescent lamp traffic light signals. This Prior Art discloses mounting a plurality of different coloured LEDs on different printed circuit board in various patterns. It should be noted that the three primary traffic signals (Stop, Go, Caution) require three different circular arrays of red, green and yellow LEDs.

U.S. Pat. No. 4,857,920 (Kataoka et. al.) discloses a traffic light signal comprised of two or more semiconductor thin-film EL plates 7, 8 such as green and red one stacked on top of the other. This Prior Art deals with fabricating a single traffic light signal that will produce three different colours depending on whether voltage is applied to either or both thin-film EL elements (See FIG. 2*a*, FIG. 2*b*, FIG. 2*c*, FIG. 2*d*—Prior Art). This Prior Art states the advantages of lower power consumption, less maintenance and providing all 3 traffic signals (Red, Green, Yellow) in a single lens traffic light. It should be noted that this Prior Art does not appear to disclose a method for informing a colour blind person as to which traffic signal (Stop, Go, Caution) is currently activated.

U.S. Pat. No. 6,054,932 (Gartner et. al.) discloses a single LED traffic light that provides at least three signals (Stop, Go, Caution). This traffic signal comprises the mounting of a plurality of different coloured LEDs 16 mounted on a single printed circuit board 15. The sign comprises 4 concentric (sometimes overlapping) patterns of LEDs; an octagon, a second octagon, a circle and a triangle. (See FIG. 3*a*, FIG. 3*b*, FIG. 3*c*, FIG. 3*d*—Prior Art). Various combinations of different coloured LEDs 17, 19, 20 are placed in the overlapping areas of the concentric shapes. The different traffic signals, for example; Stop, Go, Caution, are activated and controlled by powering individual LEDs by a suitable power source and switches. This Prior Art states the advantages of providing at least three traffic signals (Stop, Go, Caution) in a single lens traffic light.

LIMITATIONS OF PRIOR ART

In the Prior Arts described in *Tech Update* by E Source, November 1995, pp. 1-16 and Secs. 13.1 to 13.2.2 of E Source Publication, 1994 and U.S. Pat. No. 6,054,932 (Gartner et. al.), a first limitation is that day time and night time power consumption will be the same. A second limitation of these Prior Arts is that night time light pollution is very significant. A third limitation of these Prior Arts is that they produce very significant and dangerous glare that can disorient vehicle drivers and pedestrians at night time.

In the Prior Art described in U.S. Pat. No. 4,857,920 (Kataoka et. al.), a principal limitation is day time operation. Thin Film EL plates do not produce sufficient light to be visible in day light conditions.

SUMMARY OF THE PRESENT INVENTION

It is therefore the object of the present invention to eliminate the disadvantages and limitations of the Prior Art by providing an improved illuminated signage apparatus that is not obvious to a person skilled in the Art. The present invention discloses illuminated signage apparatus such as a traffic light module that has reduced night time power consumption, that significantly reduces night time light pollution and that significantly reduces dangerous night time glare and that has a significantly longer operational lifetime.

The present invention provides an illuminated signage apparatus operable in high ambient light environments and in low ambient light environments comprising a first light source operable in high ambient light environments, a second light source operable in low ambient light environments, means to detect a relevant ambient light environment threshold and means to switch between the operation of the first and second light sources. The primary advantage offered by the invention is that the apparatus consumes significantly less energy during the hours of darkness or in low ambient light environments such as in a tunnel.

Preferably, the first light source operable in high ambient light environments is a three dimensional lighting means and the second light source operable in low ambient light environments is a planar or thin film two dimensional lighting means.

Advantageously, the three dimensional lighting means comprises at least one incandescent light bulb, a light emitting diode or an optical fibre.

Conveniently, the planar or thin film two dimensional lighting means comprises at least one layer of inorganic electroluminescent material, organic electroluminescent material, light emitting plasma or light emitting crystal.

Ideally, the illuminated signage apparatus comprises a first power source and a first rigid or flexible substrate on which the first light source is mounted and a means for connecting the first power source to the first rigid or flexible substrate; a second power source and a second rigid or flexible substrate comprising at least one layer of insulating material and at least one layer of conductive material and at least one layer of planar light emitting material, and at least one aperture in the said second rigid or flexible substrate and a means for connecting the second power source to the second rigid or flexible substrate; such that when the second rigid or flexible substrate is placed on the first rigid or flexible substrate the first light source protrudes through an aperture in the second rigid or flexible substrate.

Preferably, the first rigid or flexible substrate and the second rigid or flexible substrate are combined in a single rigid or flexible substrate and/or the first power source and the second power source are combined in a single power source.

The illuminated signage apparatus may include a first transparent or translucent insulation layer, a first transparent or translucent conductive layer a second transparent or translucent insulation layer, a layer of transparent, translucent or opaque light emitting material, a first transparent, translucent or opaque insulation layer, a first transparent, translucent or opaque conductive layer, a second transparent, translucent or opaque insulation layer connected together to form a stacked structure so as to provide a planar light emitting surface when voltage is applied between the said two conductive layers.

Ideally, the illuminated signage includes an enclosure for housing the assembled components and a transparent or translucent lens optionally on at least one side of the apparatus forming a seal with the enclosure.

Advantageously, the means to detect a relevant ambient light environment threshold comprises an ambient light sensor.

Conveniently, the means to switch between the operation of the first and second light sources comprises a wired or wireless signal means receivable by the power supplies.

Preferably, the second light source comprises a plurality of second light sources offset relative to the first light sources.

The illuminated signage apparatus may include means to switch any one of the individual first and/or second light sources on and off independently from any other of the individual first and/or second light sources.

The illuminated signage apparatus of the invention may be embodied as a traffic light, a variable message/information sign or any other comparable apparatus which operates in different ambient light environments.

BRIEF DESCRIPTION OF THE DRAWINGS

Accompanying drawings, FIG. 1, FIG. 2 and FIG. 3 when considered together with the documents discussed above represent the Prior Art.

FIG. 4 and subsequent drawings, which are incorporated in and form part of the specification of the present invention, illustrate embodiments by way of example only, of the present invention and, together with the description, serve to explain and clarify the principles of the invention. In the drawings;

FIGS. 4a and 4b illustrate exploded views of a first embodiment of the invention.

FIG. 4c illustrates an isometric view of the first embodiment of the invention.

FIG. 4d illustrates a front elevation view of the first embodiment of the invention.

FIG. 6 illustrate another example of the first embodiment of the invention.

With reference to FIG. 4a to FIG. 6, the above and other objects of the present invention are achieved by providing an illuminated signage apparatus such as a traffic signal comprising a printed circuit substrate 22, a transparent, translucent or opaque insulator layer 23 containing a plurality of apertures placed on 22, a transparent, translucent or opaque conductor layer 24 containing a plurality of apertures placed on 23, a transparent, translucent or opaque insulator layer 25 containing a plurality of apertures placed on 24, a layer of light emitting material 26 containing a plurality of apertures placed on 25, a transparent or translucent insulator layer 27 containing a plurality of apertures placed on 26, a transparent or translucent conductor layer 28 containing a plurality of apertures placed on 27, a transparent or translucent insulator layer 29 containing a plurality of apertures placed on 28. The layers 23, 24, 25, 26, 27, 28, 29 are stacked in such a manner that the plurality of apertures on each layer are concentric. This stacked structure forms a planar light emitting surface when voltage is applied between the two said conductor layers 24, 28. An array of LEDs 30 is mounted onto the printed circuit substrate 22 in such a manner that the individual LEDs of the array of LEDs 30 protrude through the apertures of the planar light emitting surface, as illustrated in FIG. 4b. It further consists of an enclosure 21 for housing the assembled printed circuit substrate 32 and optionally a front transparent lens 31 which forms a seal with 21 to form the complete illuminated signage apparatus (FIG. 4c).

Figure 1A:
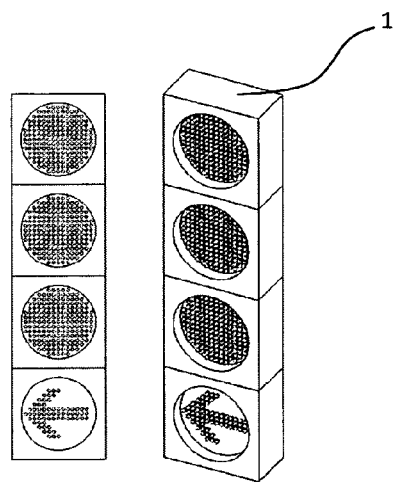
Figure 1B:
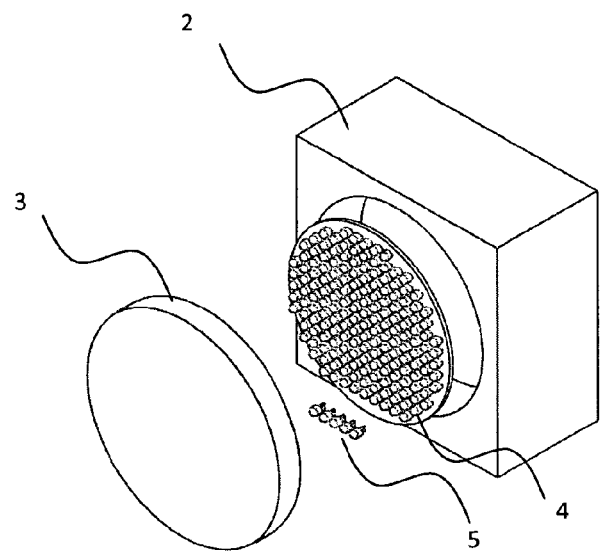
Figure 1C:
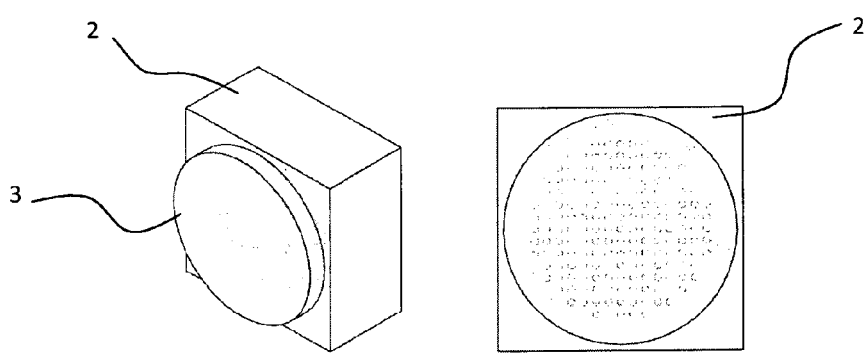
Figure 2A:
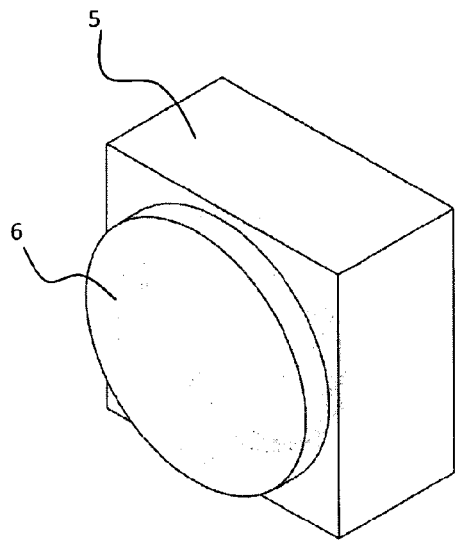
Figure 2B:
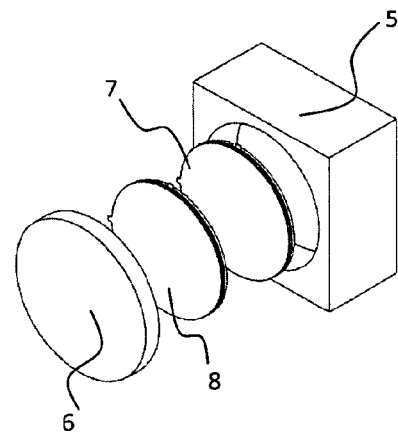
Figure 2C:
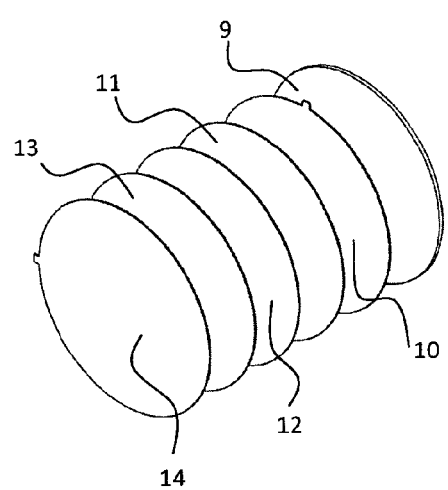
Figure 2D:
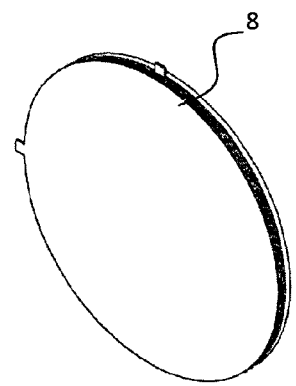
Figure 3A:
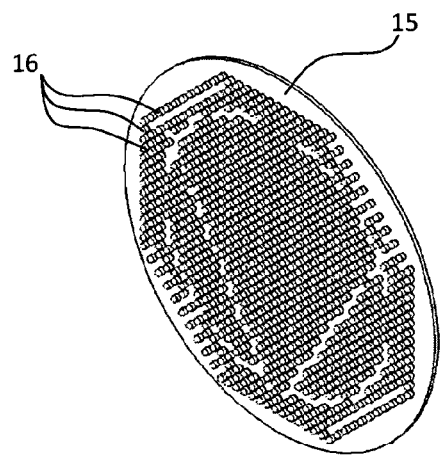
Figure 3B:
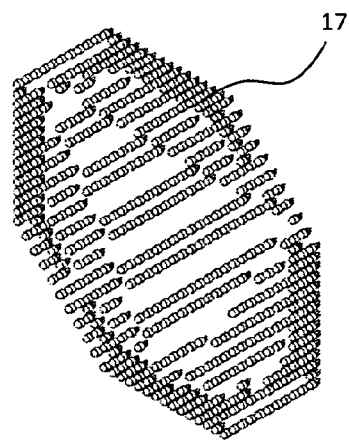
Figure 3C:
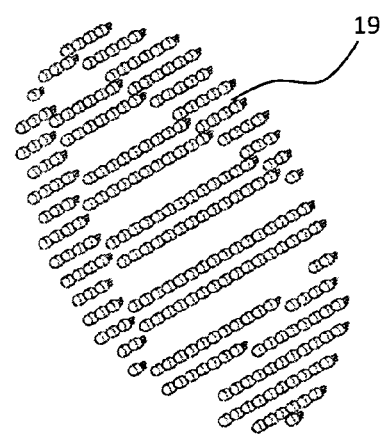
Figure 3D:
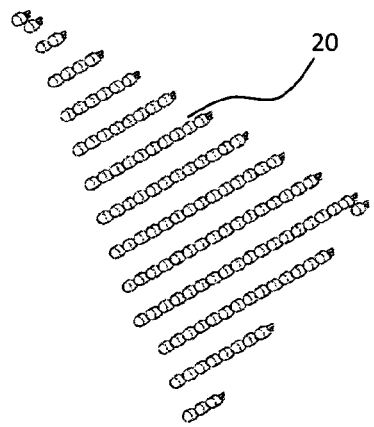
Figure 5:
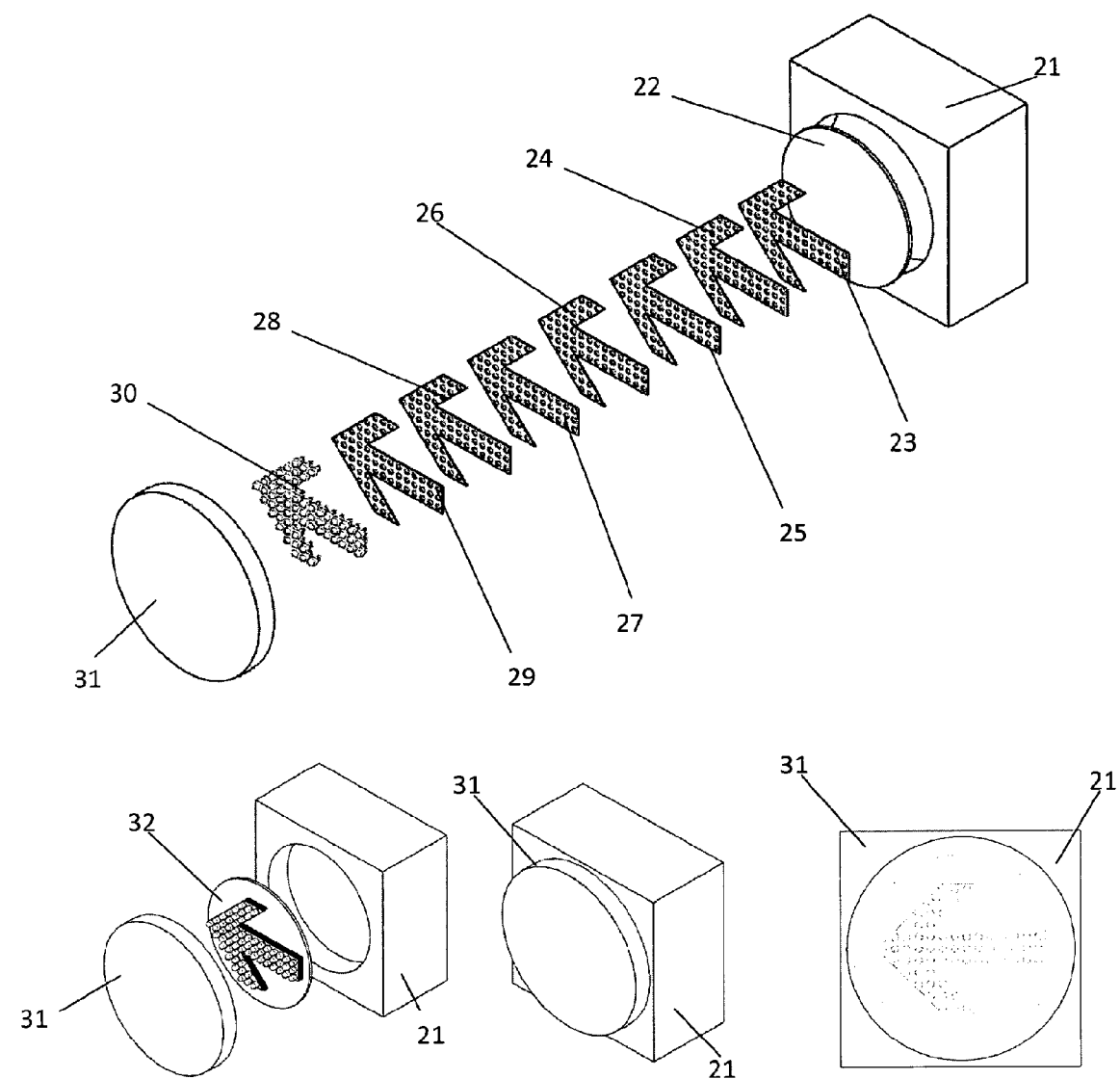
FIG. 5 illustrates another example of the first embodiment of the invention.

Enclosure 21 also contains a suitable ambient light level sensor connected to a suitable power supply said power supply being capable of providing power to illuminate the LED array and/or the planar light emitting surface. Above a predetermined ambient light level (measured by the ambient light level sensor) the power supply will provide power to the array of LEDs and below the predetermined ambient light level the power supply will provide power to the planar light emitting surface. Since the planar light emitting surface will be the active light source in hours of darkness and since the planar light emitting surface consumes only a small fraction (about 5%) of the power consumed by the LED array (which is the active light source during the hours of light) a significant energy saving can be achieved with the current invention. Furthermore because the planar light emitting surface is the active light source during the hours of darkness significantly less light pollution and glare will be produced. This is the preferred embodiment of the present invention. Furthermore since the LED array will now be activated only during hours of daylight the lifetime of the illuminated signage apparatus will be approximately doubled.

The second embodiment is shown in FIGS. 7a, 7b, 8a, 8b and 8c. Parts in the second embodiment which are similar to parts in the first embodiment are given like numerals.

The above and other objects of the present invention are achieved by providing an illuminated signage apparatus such as a traffic signal comprising a printed circuit substrate 22, a transparent, translucent or opaque insulator layer 23 containing a plurality of apertures placed on 22, a series of interconnected circular transparent, translucent or opaque conductors formed in a layer 55 placed on 23, a transparent, translucent or opaque insulator layer 25 containing a plurality of apertures placed on 55, a series of isolated circular elements of light emitting material formed in a layer 54 placed on 25, a transparent or translucent insulator layer 27 containing a plurality of apertures placed on 54, a series of interconnected circular transparent or translucent conductors formed in a layer 56 placed on 27, a transparent or translucent insulator layer 29 containing a plurality of apertures placed on 56.

Figure 7A:
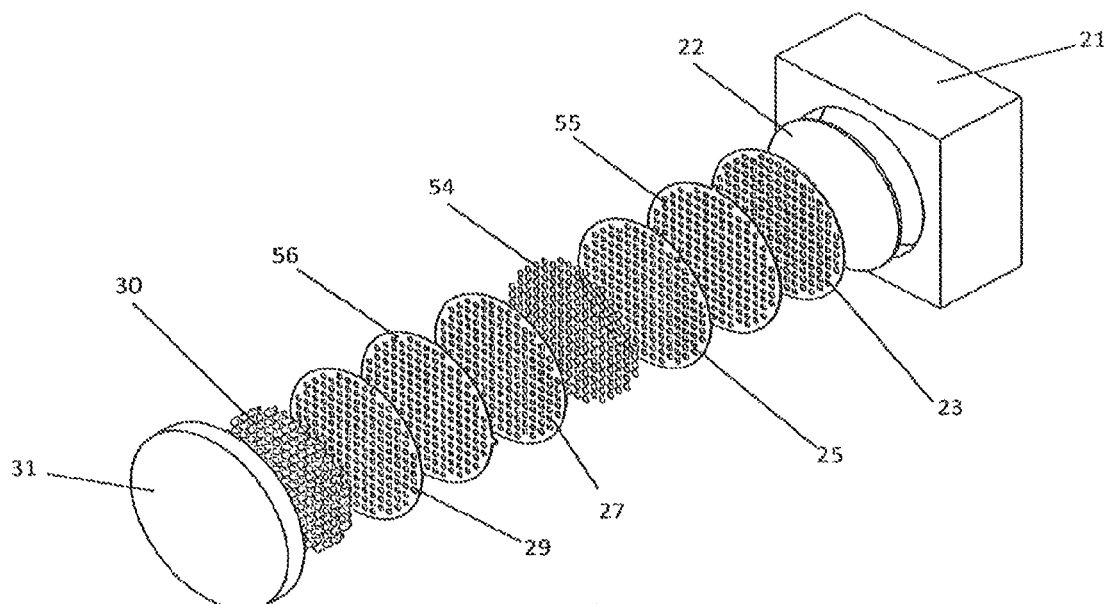
FIGS. 7 and 8 illustrates a second embodiment of the invention.
Figure 7B:
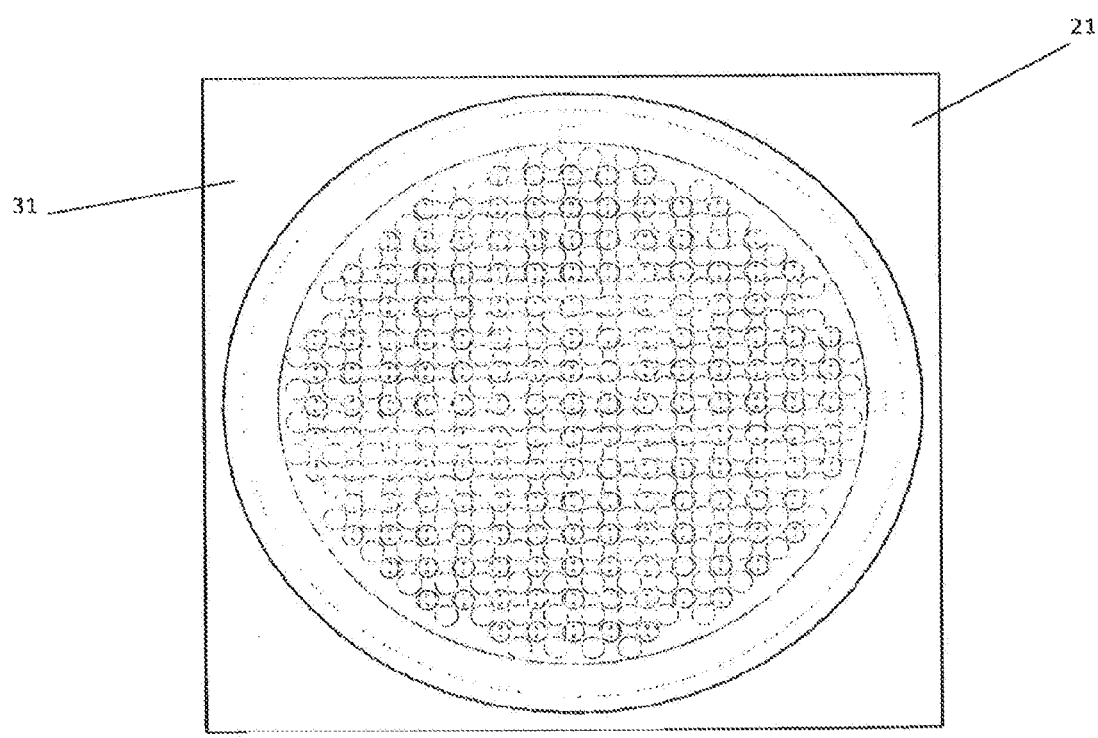
Figure 8A:
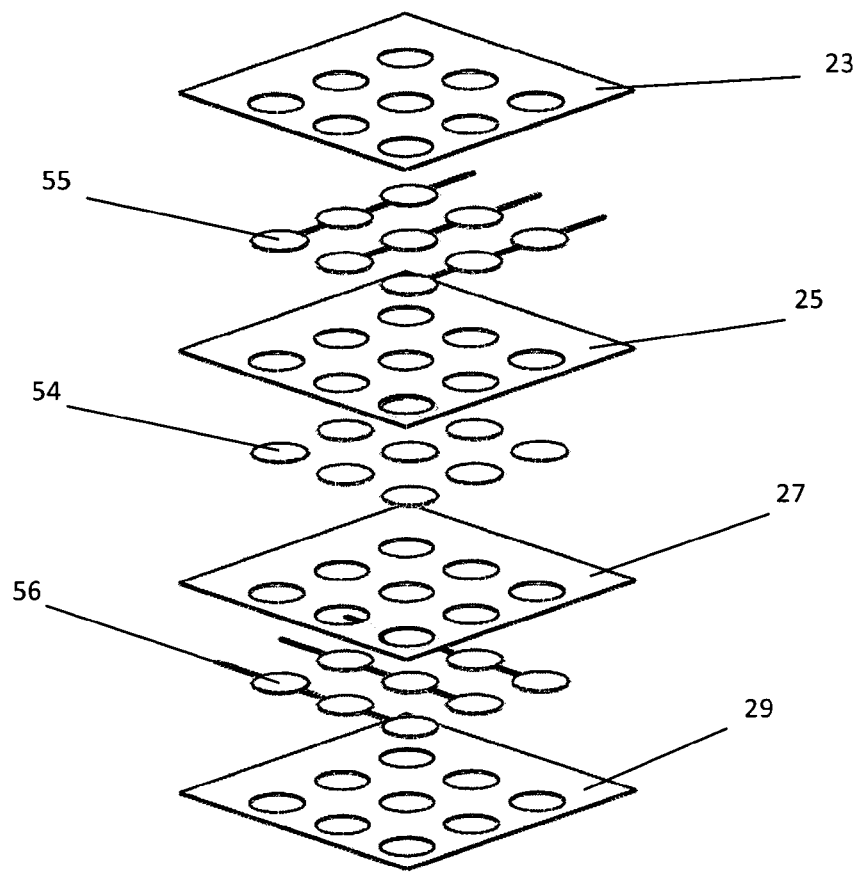
Figure 8B:
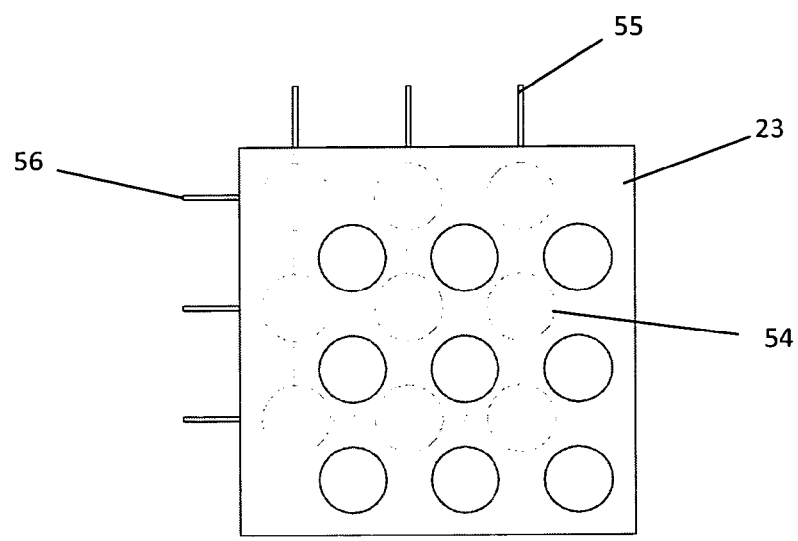
Figure 8C:
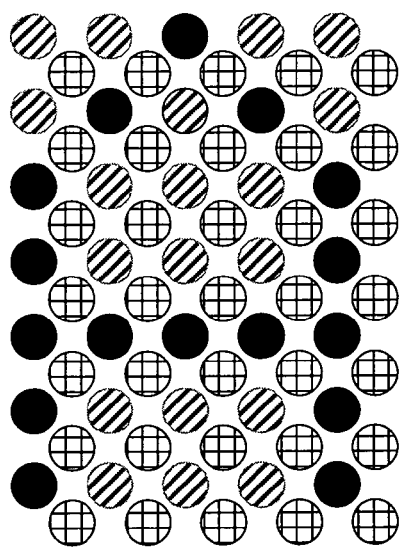
Figure 8C:
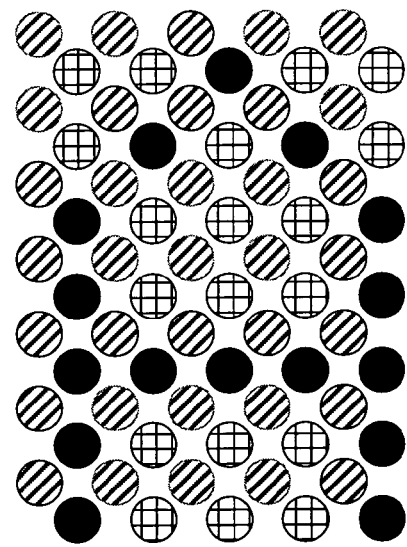

The layers 23, 55, 25, 54, 27, 56, 29 are stacked in such a manner that the plurality of apertures on layers 23, 25, 27 and 29 are concentric and such that the interconnected circular conductors in layers 55 and 56 and the isolated circular elements of light emitting material in layer 54 are also concentric but offset (as illustrated in FIG. 8b) from the apertures in layers 23, 25, 27 and 29. When voltage is applied between 55 and 56 this stacked structure forms a pattern of isolated planar light emitting circular elements offset from the apertures in layers 23, 25, 27 and 29. By selectively applying voltage between the series of conductors in layers 55 and 56 any or all of the individual isolated circular elements of light emitting material in layer 54 can be individually or collectively illuminated to display variable information as illustrated in FIG. 8c (figure on right hand side) which shows the alpha-numeric symbol "A". An array of LEDs 30 is mounted onto the printed circuit substrate 22 in such a manner that the individual LEDs of the array of LEDs 30 protrude through the apertures of layers 25, 25, 27, 29 such array of LEDs capable of being illuminated individually or collectively to display variable information as illustrated in FIG. 8c (figure on left hand side) which shows the alpha-numeric symbol "A". It further consists of an enclosure 21 for housing the assembled printed circuit substrate and optionally a front transparent lens 31 which forms a seal with 21 to form the illuminated signage apparatus (FIG. 7b).

Enclosure 21 also contains a suitable ambient light level sensor connected to a suitable power supply said power supply being capable of providing power to illuminate the LED array and/or the array of planar light emitting elements. Above a predetermined ambient light level (measured by the ambient light level sensor) the power supply will provide power to the array of LEDs and below the predetermined ambient light level the power supply will provide power to the array of planar light emitting elements. Since the array of planar light emitting elements will be the active light source in hours of darkness and since the array of planar light emitting elements consumes only a small fraction of the power consumed by the LED array (which is the active light source during the hours of light) a significant energy saving can be achieved with the current invention. Furthermore because the array of planar light emitting elements is the active light source during the hours of darkness significantly less light pollution and glare will be produced. This is the second embodiment of the present invention. Furthermore since the LED array will now be activated only during hours of daylight the lifetime of the illuminated signage apparatus will be approximately doubled.

It is to be understood that the invention is not limited to the specific details described herein which are given by way of example only, and the various modifications and alterations are possible without departing from the scope of the invention as defined in the attached claims.

The invention claimed is:

1. An illuminated signage apparatus operable in high ambient light environments and in low ambient light environments, comprising:
    A three dimensional lighting means as a first light source operable in high ambient light environments;
    A planar or thin film two dimensional lighting means having at least one layer of inorganic electroluminescent material, organic electroluminescent material, light emitting plasma or light emitting crystal as a second light source operable in low ambient light environments;
    means to detect a relevant ambient light environment threshold;
    means to switch between the operation of the first and second light sources;
    a first power source;
    a first rigid or flexible substrate on which the first light source is mounted;
    means for connecting the first power source to the first substrate;
    a second power source;
    a second rigid or flexible substrate having at least one layer of insulating material and at least one layer of conductive material and at least one layer of planar light emitting material, and at least one aperture in the second substrate so that when the second substrate is placed on the first substrate, the first light source protrudes through the aperture in the second substrate;
    a means for connecting the second power source to the second substrate;
    a first transparent or translucent insulation layer;
    a first transparent or translucent conductive layer;
    a second transparent or translucent insulation layer;
    a layer of transparent, translucent, or opaque light emitting material;
    a first transparent, translucent or opaque insulation layer;
    a first transparent, translucent or opaque conductive layer; and
    a second transparent, translucent or opaque insulation layer;
    the layers connected together to form a stacked structure providing a planar light emitting surface when voltage is applied between the two conductive layers.

2. An illuminated signage apparatus as claimed in claim 1 wherein the three dimensional lighting means comprises at least one incandescent light bulb, a light emitting diode or an optical fibre.

3. An illuminated signage apparatus as claimed in claim 1 wherein the first rigid or flexible substrate and the second rigid or flexible substrate are combined in a single rigid or flexible substrate and the first power source and the second power source are combined in a single power source.

4. An illuminated signage apparatus as claimed in claim 1, including an enclosure for housing the assembled components and a transparent or translucent lens optionally on at least one side of the apparatus forming a seal with the enclosure.

5. An illuminated signage apparatus as claimed in claim 1, in which the means to detect a relevant ambient light environment threshold comprises an ambient light sensor.

6. An illuminated signage apparatus as claimed in claim 1, in which the means to switch between the operation of the first and second light sources comprises a wired or wireless signal means receivable by the power supplies.

7. An illuminated signage apparatus as claimed in claim 1, in which the second light source comprises a plurality of second light sources offset relative to the first light sources.

8. An illuminated signage apparatus as claimed in claim 1, including means to switch any one of the individual first or second light sources on and off independently from any other of the individual first or second light sources.

9. An illuminated signage apparatus as claimed in claim 1, in which the signage apparatus comprises a traffic light.

10. An illuminated signage apparatus as claimed in claim 1, in which the signage apparatus comprises a variable message/information sign.

* * * * *